United States Patent [19]

Cervellati et al.

[11] Patent Number: 4,973,497

[45] Date of Patent: Nov. 27, 1990

[54] PROCESS OF MAKING AN ADHESIVE COATED ARTICLE

[75] Inventors: Claudio Cervellati; Giorgio Capaldi, both of Milan, Italy; Lutz E. Jacob, Tervuren, Belgium

[73] Assignee: Exxon Chemical Patents Inc., Linden, N.J.

[21] Appl. No.: 124,700

[22] Filed: Nov. 24, 1987

[30] Foreign Application Priority Data

Nov. 28, 1986 [GB] United Kingdom ............... 8628518

[51] Int. Cl.$^5$ .............................................. B05D 5/10
[52] U.S. Cl. ................................. 427/208.4; 427/385.5
[58] Field of Search ............... 427/208.4, 393.5, 385.5; 428/355, 343

[56] References Cited

U.S. PATENT DOCUMENTS 4,145,321  3/1979  Lee ................................ 427/208.4 X

FOREIGN PATENT DOCUMENTS

| 630530 | 8/1947 | United Kingdom . |
| 819635 | 5/1955 | United Kingdom . |
| 1134542 | 1/1966 | United Kingdom . |
| 1150712 | 5/1966 | United Kingdom . |

Primary Examiner—Bernard Pianalto
Attorney, Agent, or Firm—John F. Hunt; T. Dean Simmons

[57] ABSTRACT

A coated substrate such as an adhesive tape is produced by applying to a substrate a solution of a mixture of a rubber (eg. natural rubber) and a tackifier (eg. a petroleum resin) dissolved in a solvent (eg heptane) wherein the solution, prior to its application to the substrate, has been subjected to evaporation in a thin film evaporator so that the concentration of rubber and tackifier in the solvent is at least 35, usually at least 45 weight percent so enabling faster coating speeds.

14 Claims, No Drawings

PROCESS OF MAKING AN ADHESIVE COATED ARTICLE

This invention relates to the production of coated tapes especially adhesive tapes and to apparatus for their production.

Typical pressure sensitive adhesive (PSA) formulations are solutions of natural or synthetic rubber and a tackifier generally in a hydrocarbon solvent.

It is known that when producing adhesive tapes by coating a substrate with the pressure sensitive adhesive (PSA) formulation the higher the solids content in the solution of PSA, the better the drying efficiency of the coating machine. However the disadvantage is that the viscosity of the adhesive solution is high and increases with increasing solids content, for example a 25%-30% solids solution has a viscosity of 50,000 and 100,000 cps as measured on a Brookfield viscometer using a spindle No 7 or No 6 whilst a 50 wt. % solids solution has a viscosity of about 1,000,000 cps as measured at room temperature.

At present it is usual for the mixing and pumping equipment in coating lines to be limited to handling solutions of maximum viscosity of about 150,000 Mpas, as is shown in United Kingdom Patent 1150712 and which for natural rubber based pressure sensitive adhesive (PSA) is equivalent to a solids content of about 30 to 40%. There is a strong desire to coat substrates using a solids content of more than 50% and this corresponds to viscosities of 106 mPas or more when using natural rubber based PSA. With a higher solids content it would be possible to increase the speed of coating the substrate because there will be less evaporation of solvent to contend with thus increasing the capacity of the coating line. The reduction in the amount of solvent to be evaporated from the coated also has economic and environmental benefits.

We have now discovered a process for producing pressure sensitive adhesive tapes which allows application of higher solids content coatings enabling a faster coating process.

According to this invention a coated substrate is produced by a process which comprises applying to the moving substrate a solution of an adhesive formulation dissolved in a solvent in which solution prior to application to the substrate has been subjected to evaporation in a thin film evaporator so that the solids content of the solution is increased to at least 35 weight per cent.

We have found that the use of this process allows higher concentration solutions to be applied using the existing mixing apparatus, pumps and pipes, minor modifications especially to the applicator head may be beneficial. Thus in our process the adhesive formulation is generally a rubber and a tackifier which are dissolved at normal concentrations such as 20 to 35 wt per cent total solids to give solutions of conventional viscosity which are concentrated shortly before application to the substrate.

The substrate can be for example, woven or non-woven fabric (e.g. cotton fabric), paper, thermoplastic films such as polyester or cellophane. Preferably however the substrate is polyvinyl chloride (PVC) or bi-orientated polypropylene (OPP). The substrate is frequently coated with a primer coating to be more receptive to the PSA coating.

The process is continuous and therefore the substrate should be continuously moving, for example in the form of a continuous film, strip or tape. The adhesive formulation may be applied to one or both sides of the substrate.

Rubbers are generally used in PSA formulations and the preferred rubber is natural rubber or a blend of natural rubber (NR) and styrene-butadiene rubber (SBR), the ratio of NR:SBR preferably being from 60:40 to 95:5. SBR is usually made by the copolymerization of butadiene with styrene (e.g. 3 parts by weight of butadiene with 1 part by weight of styrene), the monomers being suspended in finely divided emulsion form in a large proportion aqueous detergent. SBR can however be made by a solution polymerization process.

Other suitable rubbers include polisoprene ethylene-propylene rubber (EPR), ethylene-propylene-diene terpolymer (EPDM), butyl or chlorobutyl rubber, neoprene, polybutene, polisobutylene, styrene-isoprene-styrene block copolymer (SIS), styrene-butadiene-styrene block copolymer (SBS), or saturated styrene-ethylene-butadiene-styrene block copolymer (SEBS).

EPR is normally prepared by copolymerizing the monomers (ethylene and propylene) in the presence of a Ziegler catalyst at relatively low temperatures and pressures.

EPDM is usually prepared by contacting a feed stream containing ethylene, propylene and polymerizable diolefin with a Ziegler catalyst in the presence of an inert saturated $C_5$ to $C_8$ hydrocarbon diluent. The copolymerization is usually carried out at a pressure of 1 to 5 atmospheres. The third monomer is usually a $C_6$ to $C16$ non-conjugated diolefin, e.g. 1,5-hexadiene, 1,5-octadiene or a 2-alkyl norbornadiene, such as methylidene norbornene or ethylidene norbornene.

Butyl rubber comprises a copolymer of major proportion, e.g. 85–99.9 wt per cent of a $C_4$–$C_8$ isoolefin such as isobutene, with a minor proportion, e.g. 0.1 to 15 wt per cent of a $C_4$ to $C_{14}$ multiolefin such as butadiene, dimethyl butadiene, piperylene or isoprene.

In producing halogenated butyl rubber unmodified, unvulcanized butyl rubber is halogenated, e.g. chlorinated or brominated, so as to provide about one atom of chlorine or bromine in the polymer per molecule of multiolefin present therein. Halogenated butyl rubber usually has a viscosity average molecular weight of between 150,000 and 1,500,000 and a mole per cent unsaturation of between 0.5 and 15%.

In order to achieve the desired adhesive properties the rubbers are generally tackified with a resin, such as a hydrocarbon resin, naturally occurring rosins or natural or synthetic terpinous resins.

Suitable resins are petroleum resins, (aliphatic, cyclic, aromatic or aliphatic/aromatic), resins made by the copolymerization of pure aromatic monomers (e.g. styrene, alpha methyl styrene or vinyl toluene) with olefins and/or diolefins and derivatives thereof, resin derivatives, polyterpenes or derivatives thereof or coumarone-indene resins.

Petroleum resins may be obtained by polymerizing fractions having a boiling point from $-15°$ C. to $410°$ C. at atmospheric pressure formed by the thermal cracking of petroleum feedstock. The fractions may be polymerized thermally or in the presence of a catalyst, for example, a Friedel-Crafts catalyst such as $AlCl_3$.

Usually the petroleum feedstock, e.g. light naphtha, heavy naphtha, kerosene, gas oil, vacuum gas oil and comprising $C_5$ olefins and diolefins, $C_6$ olefins and diolefins or a mixture of $C_5$ and $C_6$ olefins and diolefins is cracked in the presence of steam and the preferred temperature is between 600° and 900° C.

The products from this cracking usually have a boiling point of −5° C. to 280° C. and may comprise about 30 to 60 per cent olefins, 10 to 30 per cent diolefins, 20 to 50 per cent aromatics and 5 to 20 per cent paraffins and naphthalenes.

Preferably the product is subjected to fractionation to remove $C_2$ to $C_4$ light ends, thermal soaking and distillation to remove hydrocarbons such as cyclic diolefins including cyclopentadiene and methyl cyclopentadiene as dimers.

After thermal soaking and distillation one obtains an overhead naphtha which usually boils at temperatures from 30 to 110° C. this overhead naphtha comprises mainly $C_5$ diolefins such as isoprene and 1,3 cis- and transpentadienes, $C_5$ t° $C_6$ monoolefins and aromatics, for example benzene. Generally the overhead naphthas have the following composition but the exact composition obviously depends on the nature of the petroleum feedstock which is subjected to steam-cracking.

|  | % By Weight |
| --- | --- |
| Total paraffins | 1.0 to 41.4 |
| Total diolefins | 33.5 to 14.5 |
| Total olefins | 33.5 to 13.0 |
| Total aromatics | 30.0 to 31.0 |
| Isoprene | 16.5 to 6.5 |
| Pentadiene 1,3 | 14.5 to 2.5 |
| Cyclopentadiene | 1.0 to 2.5 |

Alternatively, the feed may be a $C_9$ feed which is a mixture of olefinic aromatics such as styrene, vinyl toluene, alpha methyl styrene and indene or mixtures of $C_5$ and $C_9$ feeds may be polymerized.

Alternatively, mixtures of $C_5$ feeds and pure aromatic monomers mentioned above, and/or terpenes may be polymerized. A particularly suitable resin is an aliphatic-aromatic resin obtained by polymerizing mixtures of olefins (essentially $C_5$ and $C_6$ olefins and diolefins) and aromatic monomers, for example, styrene, alpha methyl styrene and vinyl toluene.

If thermal polymerization takes place, the fraction, i.e. overhead naphtha, is polymerized usually at a temperature of between 200° C. and 280° C. for 1 to 8 hours. If it is polymerized in the presence of a Friedel-Crafts catalyst, the polymerization temperature can vary, for example, between −80° C. and −20° C. for 1/4 to 2 hours.

Friedel-Crafts catalysts such as aluminium trichloride, aluminium trichloride—aromatic hydrocarbon complexes, boron trifluoride, boron trifluoride-phenol complex, titanium chloride, ethyl aluminium chloride, and ferric chloride for example may be used.

These catalysts may be used in the solid, liquid or gaseous state. Usually, the amount of catalyst which is used is between 0.05 and 3.0 wt per cent based on the weight of the material to be polymerized.

After polymerization the residual catalyst may be removed, for example, by washing with an aqueous solution of alkali, ammonia or sodium carbonate or by the addition of an alcohol such as methanol and subsequent filtration.

The final resin may then be stripped of unreacted hydrocarbons "raffinate" rich in benzene and/or paraffins (unreacted olefins) and low molecular weight oily oligomers by steam stripping or vacuum distillation.

The finished product usually has a softening point of from 0° to 250° C.

If desired hydrogenated products of these resins can also be used. Hydrogenation can be performed at a reaction temperature of 150° C. to 250° C., a hydrogen reaction pressure of 30 to 350 bar using a catalyst such as nickel or Raney nickel supported on a diactomaceous earth, alumina, silica gel or pumice carrier, in a solvent such as an aliphatic saturated hydrocarbon, for example hexane or heptane.

In general the preferred resins are aliphatic petroleum resins obtained by polymerizing a fraction having a boiling point of −5° C. to 60° C. at atmospheric pressure using a Friedel-Crafts catalyst.

The hydrocarbon resins are usually solid at ambient temperature and usually have an average molecular weight of 500 to 3000, preferably 700 to 2000. However, liquid or semi-liquid resins can be used.

The ratio of rubber to tackifier in typical PSA formulations can vary but usually lies between 1:2 and 2:1 by weight, for example 40:60 to 60:40, preferably about 1:1 by weight.

The solvent is preferably an aliphatic or aromatic hydrocarbon, for example hexane, heptane, octane, decane, or toluene, or xylene. In general the hydrocarbon should preferably have a boiling point lying in the range 60° to 90° C.

Before subjecting the solution of rubber and tackifier to evaporation in the thin film evaporator, the concentration of rubber and tackifier in the solvent can be quite low, for example 20 to 40 wt per cent, for example about 30 wt per cent.

A typical thin film evaporator comprises a cylindrical container which is heated and into which the solution to be evaporated (the product) is introduced. By mechanical means, e.g. by a rotor, the product introduced into the top of the thin film evaporator is smeared onto the inner wall of heated sections of the evaporator, thereby forming a turbulent film which descends towards the bottom of the evaporator with a helical motion. During this period which can be very short (e.g. from 5 to 30 seconds), evaporation of the volatile components occurs. The walls of the evaporator can be heated by injection of saturated dry steam or hot oil into the jacket of cylindrical sections of the evaporator. The preferred surface area of the evaporator depends on the throughput of the adhesive formulation and the difference between the initial and final solids content.

The evaporator is usually operated under a vacuum and the vapors sucked by the vacuum ascend countercurrently of the product, towards the top and can be collected. Preferably the vapors are passed to a separator where entrained liquid is removed from the vapor. The concentrated product descends to the bottom of the evaporator within a few seconds and may be removed therefrom. The viscosity of the initial product is generally at least 100 Pas, but it is usually possible to obtain high viscosities of at least 500 typically 1000 Pas, e.g. of the order of 1500 Pas with a low consumption of energy and with high thermal efficiency. It is therefore possible to achieve concentrations of rubber and tackifier in solvent of at least 35%, preferably from 45% to 70% generally to 65%, e.g. 50 to 60% by weight.

The concentrated solution of rubber and tackifier in solvent is thereafter applied to the substrate. This may be achieved by conventional methods, for example by die coating or the use of rollers, or by a coating knife.

In the die coating process the substrate, e.g. a film, is coated as it emerges from a die on one surface with the solution of rubber and tackifier in solvent. This solution may be applied by passing it through an elongated nozzle located above the continuous substrate. Alternatively rollers may be used to apply the solution to one surface of the continuous substrate. Rollers may also be used to apply the solution onto the substrate. As an alternative to the use of rollers or an elongated nozzle a coating knife may be used. Facilities should be provided for removing the evaporating solvent during the coating process. Minor modifications of the coating head may be needed to handle the more viscous, higher solids content, solutions.

By adjusting the relative amount of the coating solution to the speed of the substrate and/or the concentration of the solution once can vary the dry thickness of the coating on the substrate.

In practice for PSA tapes a film of rubber and tackifier of thickness of 5-150 micron on a substrate is used. For packaging tape for example, a dry coating thickness of 18 to 25 micron is preferable.

By using the process of this invention one is able to achieve relatively fast production of coated substrates such as adhesive tapes, etc. with rubber and tackifier, e.g. pressure sensitive adhesive using conventional mixing pumping and piping without encountering difficulties caused by the need to evaporate large quantities of solvent.

A typical coating line employing the invention therefore consists of a vessel in which an initial solution of the adhesive formulation is prepared, this is generally a large tank which is stirred and if necessary heated or cooled to which solvent and the components of the formulation are fed.

The solution is then pumped from the vessel to a storage tank and then to the coating head of the coating line through a thin film evaporator such as previously described where the solution is concentrated and some of the solvent recovered. The concentrated solution is then pumped to the coating head from which it is applied to the moving substrate which then passes into an oven where the remainder of the solvent is evaporated and recirculated via solvent recovery to the original vessel. The coated substrate may then be cut into the appropriate widths according to the product desired.

The invention is illustrated by the following Example:

EXAMPLE

In this Example a polyvinylchloride (PVC) packaging tape was coated with natural rubber based solvent pressure sensitive adhesive (PSA). This solution consisted of 100 parts by weight natural rubber (SMR CV 60)
100 parts by weight Hydrocarbon resin—a blend of approximately equal proportions by weight of Escorez 1202 and 2101 supplied by Exxon Chemical
1 part by weight antioxidant dissolved in heptane at 30 weight % solid concentration and had a viscosity of about 50 mPas.

This PSA solution was prior to coating concentrated in a thin film evaporator sold by Zanon to a solids content of 50 weight per cent to give a viscosity of about 500 Pas.

The concentrated PSA solution was then coated by means of die coating from a Berna-Tec GID coating head onto the primer coated surface of continuously moving rigid polyvinyl chloride film.

The coating was regulated to a dry coating weight of 20g/m$^2$. After evaporation of the solvent in a drying oven the PSA tape thus produced was wound on to large rolls. These rolls were slit on a separate machine into desired tape dimensions.

The performance of the tape is determined by measuring the PSA properties according to standard test methods. The following properties were measured on the tape:

| | |
|---|---|
| 180° Peel adhesion (PSTC - 1) | g/cm 280 |
| Ball tack (PSTC - 6) | cm 2 |
| Loop tack (FTM - 9) | N/25 mm 8 |

What is claimed is:

1. In a process for producing an adhesive-coated substrate by applying an adhesive formulation dissolved in a solvent to a moving substrate, and evaporating the solvent, the improvement which comprises:
    dissolving the adhesive in hydrocarbon solvent to form a solution of the adhesive having a low-solids content;
    passing the solution through a thin film evaporator to increase the solids content to at least about 35% by weight; and
    applying the concentrate adhesive to the substrate.
2. A process according to claim 1 in which the adhesive formulation is a mixture of a rubber and tackifier.
3. A process according to claim 2 wherein the rubber is natural rubber or a blend of natural rubber and styrene butadiene rubber.
4. A process according to claim 2 wherein the tackifier is a hydrocarbon petroleum resin.
5. A process according to claim 4 wherein said hydrocarbon petroleum resin is an aliphatic/aromatic resin polymerized from a mixture of olefins and aromatic monomers.
6. A process according to claim 4 wherein the adhesive formulation comprises 100 parts of said rubber and 100 parts of said resin.
7. A process according to claim 4 wherein the adhesive formulation is applied in a thickness of 5 to 150 microns.
8. A process according to claim 2 wherein said rubber is selected from the group consisting of natural rubber; ethylene-propylene rubber; ethylene-propylene-diene terpolymer; butyl rubber; and chlorobutyl rubber.
9. A process according to claim 1 wherein the substrate is polyvinyl chloride or biorientated polypropylene.
10. A process according to claim 1 wherein the solvent is hexane or heptane.
11. A process according to claim 1 wherein the viscosity of the solution after its subjection to evaporation is at least 500 Pas.
12. A process according to claim 1 wherein the concentration of the adhesive formulation in the solvent when it is applied to the substrate is at least 45 percent by weight.
13. A process according to claim 12 in which the concentration is 50 to 60 percent by weight.
14. A process according to claim 1 in which the concentration of the adhesive formulation prior to evaporation is 20 to 35 percent by weight.

* * * * *